United States Patent [19]

Yanai et al.

[11] Patent Number: 5,269,011
[45] Date of Patent: Dec. 7, 1993

[54] DYNAMICALLY RECONFIGURABLE DATA STORAGE SYSTEM WITH STORAGE SYSTEM CONTROLLERS SELECTIVELY OPERABLE AS CHANNEL ADAPTERS ON STORAGE DEVICE ADAPTERS

[75] Inventors: Moshe Yanai, Framingham; Natan Vishlitzky, Brookline; Bruno Alterescu, Newton; Daniel Castel, Framingham, all of Mass.

[73] Assignee: EMC Corporation, Hopkinton, Mass.

[21] Appl. No.: 587,247

[22] Filed: Sep. 24, 1990

[51] Int. Cl.⁵ .......................................... G06F 13/00
[52] U.S. Cl. .................................. 395/425; 395/500; 364/DIG. 1; 364/245; 364/245.3; 364/268.7; 364/268.6; 364/269.2
[58] Field of Search .......................... 395/400, 425; 364/200 MS File, 900 MS File, 245, 268.7, 269.2

[56] References Cited

U.S. PATENT DOCUMENTS

| | | | |
|---|---|---|---|
| 4,075,693 | 2/1978 | Fox et al. | 364/200 |
| 4,467,421 | 8/1984 | White | 364/200 |
| 4,574,346 | 3/1986 | Hartung | 395/425 |
| 4,638,425 | 1/1987 | Hartung | 395/425 |
| 5,005,172 | 4/1991 | Kawamoto | 371/18 |
| 5,051,887 | 9/1991 | Berger et al. | 395/425 |

OTHER PUBLICATIONS

IBM 3390 Disk Technology, ©1990 Computer Technology Research Corp., in its entirety (full text may be found in copending U.S. Appln. No. 07/586,796, filed Sep. 24, 1990, our file EMC-103XX).

IBM 3880 Storage Control Models 1, 2, 3 and 4 Description Manual, IBM Publication Number GA26-16-61-9, ©1987 IBM Corporation, in its entirety (full text may be found in copending U.S. Appln. 07/586,796, filed Sep. 24, 1990, our file EMC-103XX).

Primary Examiner—Joseph L. Dixon
Assistant Examiner—Frank J. Asta
Attorney, Agent, or Firm—Daniel J. Bourque

[57] ABSTRACT

A dynamically reconfigurable data storage system includes a plurality of storage system controllers, each of which is selectively operable at any given time as one of a channel adapter and a storage device adapter as established by commands received by each of the controllers. At least one semiconductor memory is coupled to the storage system controllers. Additionally, a data storage system director issues commands to each of the storage system controllers for establishing a first quantity of the system controllers as channel adapters, for transmitting and receiving at least data and commands to and from one or more host computers over a plurality of data communication channels. The data storage system director also establishes a second quantity of the storage system controllers as storage device adapters, for cotrolling data transfer to and from a plurality of data storage devices.

20 Claims, 2 Drawing Sheets

DYNAMICALLY RECONFIGURABLE DATA STORAGE SYSTEM WITH STORAGE SYSTEM CONTROLLERS SELECTIVELY OPERABLE AS CHANNEL ADAPTERS ON STORAGE DEVICE ADAPTERS

FIELD OF THE INVENTION

This invention relates to computers and more particularly, to data storage systems.

BACKGROUND OF THE INVENTION

Data storage system managers and designers are constantly faced with the problem of how to best design large data storage systems to optimize system performance and increase reliability.

If the data storage system is designed with high I/O activity and low storage space requirements in mind, the consequences of running out of data storage space can be significant. Conversely, a system designed to provide a large amount of data storage and a low to moderate amount of I/O activity will suffer performance degradation during periods of peak I/O activity. Although both types of system designs work well for their intended purpose, neither provides a data storage system which is capable of changing configuration along with a corresponding change in I/O activity vs. disk space requirements change. Thus, most systems compromise disk storage space for an increased I/O activity level or vice versa. Additionally, if a portion of the system should malfunction, the system may become inoperable, or at best, operate with decreased performance due to the malfunction.

Although some systems can be expanded or reconfigured by adding and/or subtracting from the system hardware, all or a portion of the data storage system may have to be taken off line to effect the changes in configuration. Most importantly, a change in system configuration to generally optimize system performance may not provide for optimum system performance during certain periods of time or for processing certain types of data.

SUMMARY OF THE INVENTION

This invention features a dynamically reconfigurable data storage system for receiving and transferring data to and from one or more host computers over a plurality of data communication channels. The system includes a plurality of system controllers, each of the system controllers selectively operable as a channel adapter and a storage device adapter as controlled by commands received by each of the system controllers. The system also includes at least one semiconductor memory coupled to the system controllers. At least one data storage system director is coupled to the system controllers, for issuing commands to each of the system controllers, for establishing a first quantity of the system controllers as channel adapters for receiving data and commands from the one or more host computers, and for transmitting data and status information to the one or more host computers over one or more data channels. The data storage system director also establishes a second quantity of system controllers as storage device adapters, for controlling data transfer to and from the data storage system and a plurality of data storage devices.

In one embodiment, the system further includes at least one data storage system performance monitor, for monitoring the performance of the data storage system. The data storage system performance monitor may be adapted for monitoring the number of requests for access to the data storage system, the data storage system storage device requirements, and data storage system malfunctions. In this embodiment, the data storage system director is responsive to the data storage system performance monitor for establishing the first quantity of channel adapters and the second quantity of storage device adapters. Additionally, the data storage director is operative for dynamically altering the first quantity of channel adapters and second quantity of storage device adapters in response to the data storage system performance and malfunction monitor.

BRIEF DESCRIPTION OF THE DRAWINGS

These, and other features of the present invention are described below in the following detailed description and accompanying drawing, in which.

DETAILED DESCRIPTION OF THE INVENTION

Figure 1:
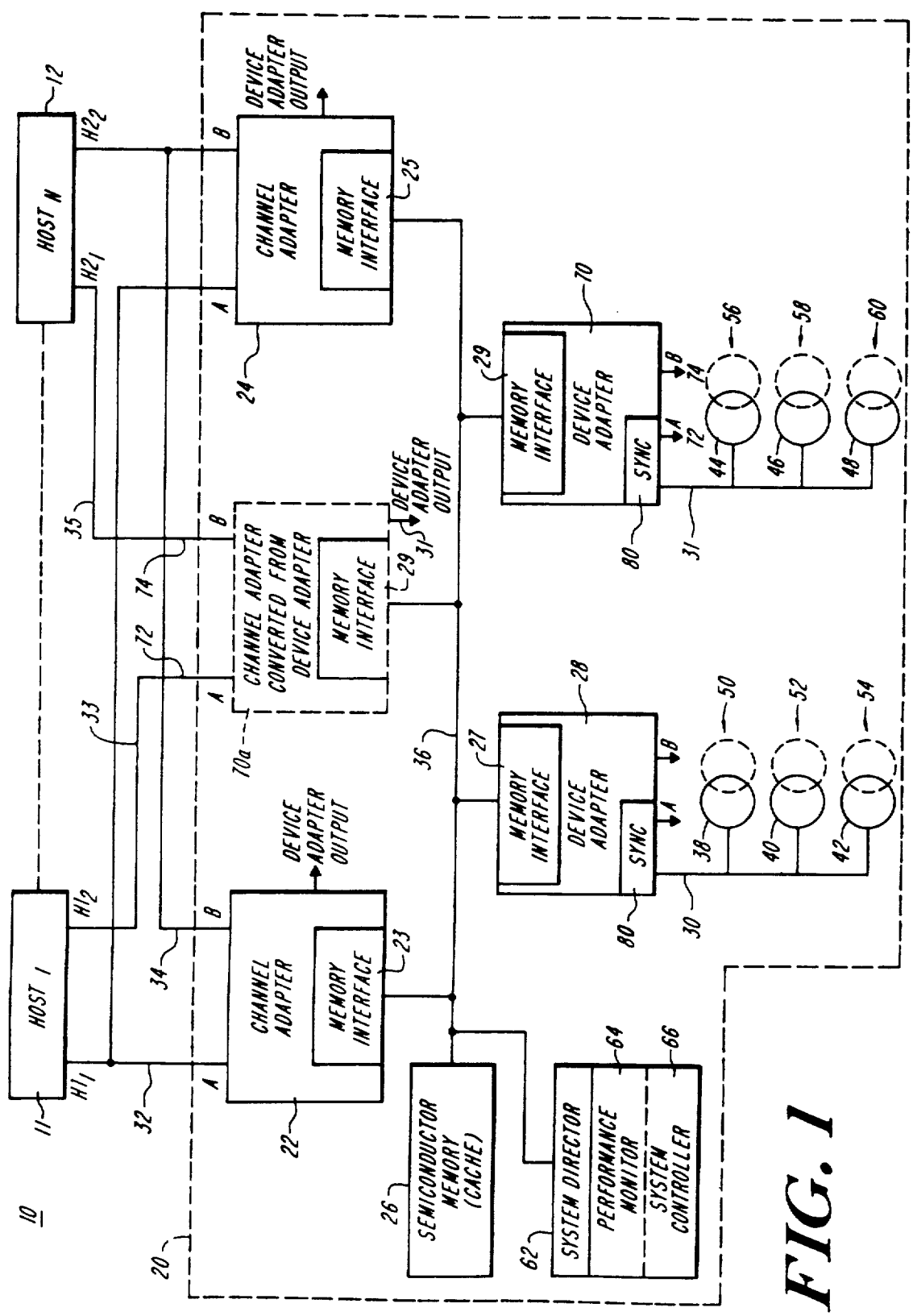
FIG. 1 is a block diagram of the dynamically reconfigurable data storage system of the present invention.

The dynamically reconfigurable data storage system 10, FIG. 1, according to the present invention is adapted to receive commands and data from one or more host computers 11 and 12 such as IBM 3090 host computer systems. Each host typically includes two or more channels herein labeled $H1_1$, $H1_2$, $H2_1$, and $H2_2$. Each channel of each of the host computers 12 is connected to at least one channel adapter.

For example host 11 has its channel $H1_1$ coupled to channel A of channel adapter 22 and channel A of channel adapter 24 by means of signal path 32. Similarly, host 12 has its channel $H2_2$ coupled to channel B of channel adapter 24, and channel B of channel adapter 22 by means of signal path 34. Additionally, host 11 has its channel $H1_2$ coupled to channel A, by means of signal path 72, of the device adapter 70 reconfigured as channel adapter 70a, while host 12 has its channel $H2_1$ coupled to channel B, of reconfigured channel adapter board 70a by means of signal path 74.

The dynamically reconfigurable data storage system of the present invention 20 is comprised of one or more channel adapters 22,24; at least one semiconductor memory 26: and one or more storage device adapters 28,30. The channel adapters receive data and commands from the one or more host computers, and transmit data and status information to the hosts. Each channel adapter 22,24 includes a memory interface 23,25 through which data and commands received by the channel adapters may be directed either to memory 26, or to one or more storage device adapters 28,30 over memory bus 36.

Semiconductor memory 26 is typically comprised of high-speed RAM and may function as either a solid state disk (SSD) or as a memory cache for temporary data storage.

Storage device adapters 28,70. also include a memory interface 27,29 respectively. Each storage device adapter controls one or more storage devices such as disk drives 38–48 over at least one channel 30 and 31 which may include a SCSI interface. In one embodiment, the disk drives may be operated in pairs 50-60 to effect data "mirroring", for providing data redundancy and reduced latency data access as described in greater detail in U.S. Pat. application No. 07/587,026 entitled "Data Storage System with Data Mirroring and Reduced Latency Data Retrieval" which is filed concurrently herewith and incorporated herein by reference.

An important feature of the present invention is that although the channel adapters and the storage device adapters perform specific yet different functions, each adapter includes the necessary hardware required to function as either type of adapter under the control of commands received from a system director 62 which establishes the functionality of each adapter at any given moment in time. Such an adapter board is described in greater detail in U.S. Pat. application No. 07/587,243 entitled "Reconfigurable, Multi-Function Disk Controller" filed concurrently herewith and incorporated herein by reference.

The system director 62, according to the present invention, performs the function of a system performance monitor 64 and a system controller 66. Such a director 62 may be implemented, as shown, by an external device such as a PC connected to the system. In one embodiment, the director is coupled to each adapter board. The function of the system director may also be performed by one of the adapter boards.

The performance monitor function 64, of the system director 62, monitors preselected data storage system operational criteria, such as the number of system access requests over a given period of time, (also called the system activity level), the amount of utilized or available data storage space, and system malfunctions. The criteria and base performance level of each criteria are established either by the system manager during system installation or by the system designers Thus, if during system operation, the system performance monitor 64 detects a decrease in system performance as indicated by one or more of the selected monitored criteria, the system monitor will command the system controller function 66 of the system director 62 to dynamically reconfigure the system to increase system performance.

By way of example, the dynamically reconfigurable data storage system 10 shown in FIG. 1 is initially illustrated with two operative channel adapters 22 and 24 and two operative storage device adapters 28 and 70. This is for example only, and any combination of reconfigurable channel and storage device adapters is contemplated by the present invention.

Should one or more channel adapter such as channel adapter 24 suddenly malfunction, the system monitor function 64 may direct system controller 66 to command storage device adapter 30 to reconfigure itself to a channel adapter as shown in phantom at 70a. Storage device adapter 70 may be reconfigured by commanding it to execute micro-code contained in the adapter, or alternatively, by executing new micro-code sent to the adapter by the system controller function 66 of the system director 62. By providing the data storage system 10 with an additional channel adapter 70a, the system will provide two additional channels and signal paths 72,74, over which one or more hosts may access the system, thereby replacing the channels lost with the malfunction of channel adapter 24.

Additional system reconfigurations include assigning memory 26 as solid-state storage or cache, or adjusting the synchronization of any pairs of "mirror" disks or storage devices by the storage device adapter synchronizer 80, as described in greater detail in U.S. Pat. application No. 07/587,026 entitled "Data Storage System with Data Mirroring and Reduced Latency Data Retrieval" filed concurrently herewith and incorporated herein by reference.

Figure 2:
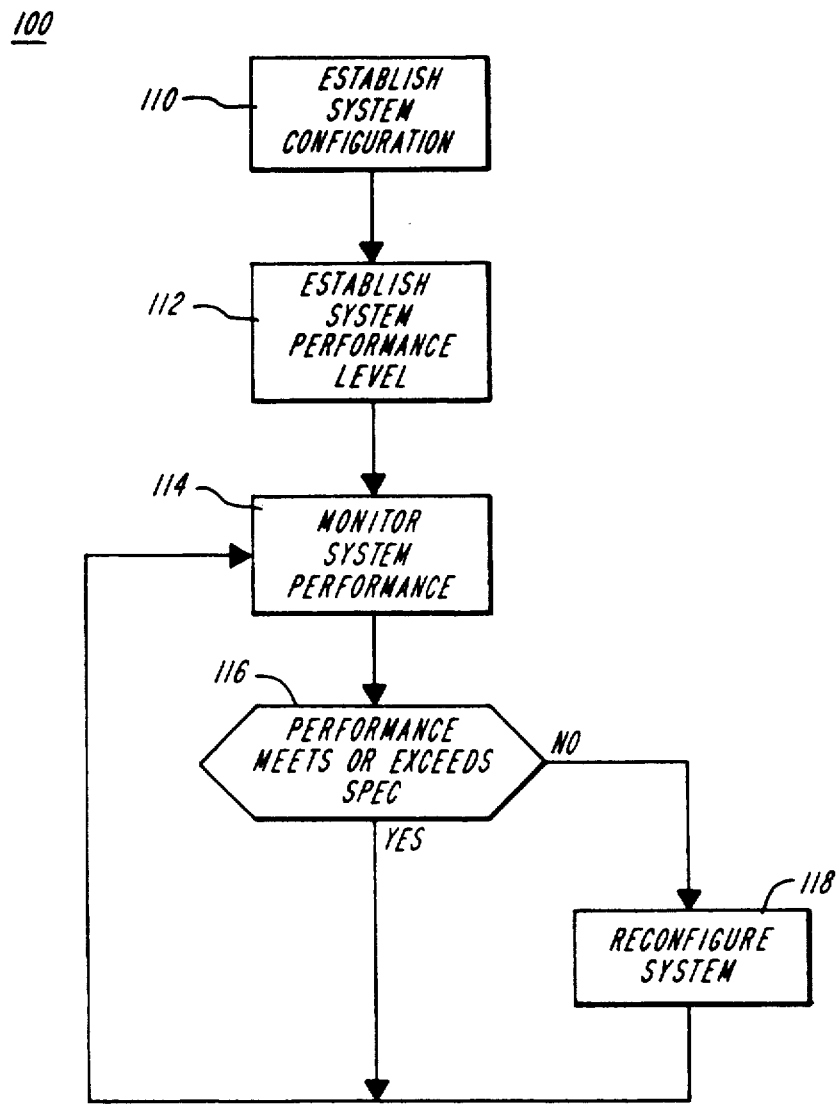
FIG. 2 a flow chart illustrating the method of dynamically reconfiguring a data storage system according to the present invention.

The method of monitoring and dynamically altering or reconfiguring a data storage system to improve system performance is illustrated in flow chart 100, FIG. 2, wherein at step 110, the system configuration of channel adapters, storage device adapters, memory, and storage devices are established. Subsequently, the system designers or the storage system manager establish the performance level which the system is to achieve as determined by measuring several criteria as previously discussed, step 112.

The system monitor function of the system director then monitors the system performance by constantly monitoring the established criterion, step 114. If the data storage system performance level meets the previously established performance level, step 116, control returns to the step of monitoring the system, step 114. If, however, the system performance level as measured and determined at step 116 does not meet the established level, the method proceeds to step 118 where the system director reconfigures the system according to the pre-established guidelines, to increase the performance of the system. The method then returns to step 114 to monitor the system performance.

Modifications and substitutions by one skilled in the art are considered to be within the scope of the present invention, which is not to be limited except by the claims which follow.

We claim:

1. A dynamically reconfigurable data storage system coupled to at least one host computer over a plurality of data communication channels, comprising:

a plurality of storage system controllers, a plurality of said plurality of storage system controllers selectively operable at any given time as one of a channel adapter and a storage device adapter, as established by commands received by each of said plurality of selectively operable storage system controllers; and each of said plurality of selectively operable storage system controllers responsive to a data storage system director, said data storage system director for issuing said commands to each of said plurality of selectively operable storage system controllers, for establishing a first quantity of said plurality of selectively operable storage system controllers as channel adapters, for transmitting and receiving at least data and commands to and from said at least one host computer over at least one data channel, and for establishing a second quantity of said plurality of selectively operable storage system controllers as storage device adapters, for controlling data transfer between the at least one semiconductor memory, the first quantity of channel adapters, and a plurality of data storage devices.

2. The system of claim 1 further including at least one data storage system performance monitor, for monitoring the performance of the data storage system.

3. The system of claim 2 wherein said data storage system director is responsive to said data storage system performance monitor, for establishing said first quantity of storage system controllers operable as channel adapters and for establishing said second quantity of storage system controllers operative as storage device adapters.

4. The system of claim 3 wherein said data storage system director is operative for dynamically altering said first quantity of storage system controllers operable as channel adapters and said second quantity of storage system controllers operative as storage device adapters in response to said data storage system performance monitor.

5. The system of claim 2 wherein said data storage system performance monitor monitors data storage system activity levels including the number of requests for access to the data storage system.

6. The system of claim 2 wherein said data storage system performance monitor monitors data storage system storage device requirements.

7. The system of claim 2 wherein said data storage, system performance monitor monitors data storage system malfunctions.

8. The system of claim 1 wherein said plurality of data storage devices include at least one direct access storage device.

9. The system of claim 8 wherein said at least one direct access storage device includes at least one disk drive.

10. The system of claim 1 wherein said first quantity of channel adapters is equal to said second quantity of storage device adapters.

11. The system of claim 1 wherein said plurality of data storage devices are operative in pairs of first and second data storage devices, each operative pair of data storage devices including a plurality of generally identical data records.

12. The system of claim 11 wherein said selectively operable storage system controllers include a data storage device synchronizer, for synchronizing the operation of the first data storage device to the second data storage device of at least one pair of data storage devices.

13. The system of claim 1 wherein said data storage system director is coupled to at least each of said plurality of selectively operable storage system controllers.

14. The system of claim 1 wherein at least one of said selectively operable storage system controllers includes said data storage system director.

15. A dynamically reconfigurable data storage system coupled to at least one host computer over a plurality of data communication channels, comprising:

a plurality of storage system controllers, a plurality of said plurality of storage system controllers selectively operable at any given time as one of a channel adapter and a storage device adapter, as established by commands received by each of said plurality of selectively operable storage system controllers;

each of said plurality of selectively operable storage system controllers responsive to a data storage system director, said data storage system director operative for issuing said commands to each of said plurality of selectively operable storage system controllers, for establishing a first quantity of said plurality of selectively operable storage system controllers as channel adapters, for transmitting and receiving at least data and commands to and from said at least one host computer over at least one data channel, and for establishing a second quantity of said plurality of selectively operable storage system controllers as storage device adapters, for controlling data transfer between the at least one semiconductor memory, the first quantity of channel adapters, and a plurality of data storage devices; and said data storage system director including a data storage system performance monitor, for monitoring data storage system activity levels, and for dynamically altering said first quantity of storage system controllers selectively operable as channel adapters, and said second quantity of storage system controllers selectively operable as storage device adapters in response to said data storage system performance monitor, and for reconfiguring at least one of said data storage system controllers thereby changing at least one of said first quantity of channel adapters and said second quantity of storage device adapters from a channel adapter to a storage device adapter, or from a storage device adapter to a channel adapter.

16. A method for monitoring and dynamically controlling a reconfigurable data storage system having a plurality of storage system controllers, each of said storage system controllers selectively operable at any given moment in time, as one of a channel adapter and a storage adapter, comprising the steps of:

establishing a first quantity of said storage system controllers as channel adapters, for transmitting and receiving at least data and commands to one or more host computers over one or more date channels;

establishing a second quantity of said system controllers, said second quantity of system controllers not part of said first quantity of system controllers, as storage device adapters, for controlling data transfer between at least one semiconductor memory, the first quantity of channel adapters, and a plurality of data storage devices;

monitoring the performance of the data storage system; and reconfiguring at least one of said system controllers thereby changing at least one of said first quantity of channel adapters and said second quantity of storage device adapters from a channel adapter to a storage device adapter, or from a storage device adapter to a channel adapter.

17. The method of claim 16 wherein the step of monitoring the performance of the system includes monitoring the number of requests for access to the data storage system.

18. The method of claim 16 wherein the step of monitoring the performance of the system includes monitoring the amount of data stored on the plurality of data storage devices.

19. The method of claim 16 wherein the step of monitoring the performance of the system includes monitoring the malfunction of any portion of the data storage system.

20. The method of claim 16 wherein the step of reconfiguring includes reconfiguring at least one semiconductor memory coupled to the first quantity of channel adapters and the second quantity of storage device adapters.

* * * * *

UNITED STATES PATENT AND TRADEMARK OFFICE
CERTIFICATE OF CORRECTION

PATENT NO. : 5,269,011
DATED : Dec. 7, 1993
INVENTOR(S) : Moshe Yanai, et al

It is certified that error appears in the above-indentified patent and that said Letters Patent is hereby corrected as shown below:

On title page, item [54] and col. 1, line 4, "ON" should be --OR--

Signed and Sealed this

Twenty-fourth Day of May, 1994

Attest:

BRUCE LEHMAN

*Attesting Officer*          *Commissioner of Patents and Trademarks*